(12) United States Patent
Zhang et al.

(10) Patent No.: US 12,220,633 B2
(45) Date of Patent: Feb. 11, 2025

(54) RENDERING METHOD AND APPARATUS

(71) Applicant: Huawei Technologies Co., Ltd., Shenzhen (CN)

(72) Inventors: Xiwen Zhang, Shenzhen (CN); Xiaopeng Zhou, Moscow (RU)

(73) Assignee: Huawei Technologies Co., Ltd., Shenzhen (CN)

(*) Notice: Subject to any disclaimer, the term of this patent is extended or adjusted under 35 U.S.C. 154(b) by 134 days.

(21) Appl. No.: 17/904,661

(22) PCT Filed: Feb. 1, 2021

(86) PCT No.: PCT/CN2021/074693
§ 371 (c)(1),
(2) Date: Aug. 19, 2022

(87) PCT Pub. No.: WO2021/164533
PCT Pub. Date: Aug. 26, 2021

(65) Prior Publication Data
US 2023/0094880 A1 Mar. 30, 2023

(30) Foreign Application Priority Data
Feb. 21, 2020 (CN) .......................... 202010108932.3

(51) Int. Cl.
*A63F 13/52* (2014.01)
*A63F 13/35* (2014.01)

(52) U.S. Cl.
CPC .............. *A63F 13/52* (2014.09); *A63F 13/35* (2014.09); *A63F 2300/538* (2013.01)

(58) Field of Classification Search
CPC .......... A63F 13/02; A63F 13/10; A63F 13/12; A63F 2300/40; A63F 2300/51;
(Continued)

(56) References Cited

U.S. PATENT DOCUMENTS 5,453,799 A * 9/1995 Yang .................... H04N 19/112
   375/E7.15
5,724,499 A * 3/1998 Nishiyama ........... G11B 27/034
   345/473

(Continued)

FOREIGN PATENT DOCUMENTS

CN     105263050 A     1/2016
CN     108022286 A     5/2018
(Continued)

OTHER PUBLICATIONS

Huhu Mi, "What should I do if the network latency is high? with these simple methods", https://www.jianshu.com/p/791786d705c3, Mar. 26, 2019, 8 pages.

*Primary Examiner* — Steven J Hylinski
(74) *Attorney, Agent, or Firm* — Slater Matsil, LLP

(57) ABSTRACT

A rendering method includes: receiving a first operation instruction from a user; rendering, according to the first operation instruction, a first image of an application corresponding to the first operation instruction; predicting a second operation instruction according to the first operation instruction; rendering, according to the second operation instruction, a second image of the application corresponding to the second operation instruction; if no operation instruction is received from the terminal device user within preset duration during running of an app after the first operation instruction is received, predicting a user operation according to the received operation instruction, where the operation instruction is an instruction that is generated through triggering by the user operation and that may trigger image switching of the app; rendering an app image based on a predicted user operation; and sending a rendered app image to the terminal device user.

20 Claims, 8 Drawing Sheets

(58) Field of Classification Search
CPC .......... A63F 2300/534; A63F 2300/538; A63F 2300/5533; A63F 2300/62; A63F 2300/632; A63F 2300/6466; A63F 2300/6661

See application file for complete search history.

(56) References Cited

U.S. PATENT DOCUMENTS

| | | | | |
|---|---|---|---|---|
| 5,862,261 | A * | 1/1999 | Lee | H04N 19/527 375/E7.106 |
| 6,415,317 | B1 * | 7/2002 | Yelon | A63F 13/30 719/329 |
| 6,445,815 | B1 * | 9/2002 | Sato | G06T 7/73 348/E13.016 |
| 6,868,434 | B1 * | 3/2005 | Terranova | H04L 43/50 709/217 |
| 7,240,162 | B2 * | 7/2007 | de Vries | H04N 21/8166 711/213 |
| 7,515,156 | B2 * | 4/2009 | Tinker | G06T 15/10 345/475 |
| 8,858,324 | B2 * | 10/2014 | Kruglick | A63F 13/355 463/29 |
| 9,756,375 | B2 * | 9/2017 | Chu | A63F 13/35 |
| 9,959,506 | B1 | 5/2018 | Karppanen | |
| 10,552,752 | B2 | 2/2020 | Kashyap | |
| 11,403,820 | B1 * | 8/2022 | Sargent | G06T 19/00 |
| 2003/0065668 | A1 * | 4/2003 | Sowizral | G06T 15/20 |
| 2008/0147971 | A1 * | 6/2008 | Hawkins | A63F 13/00 711/E12.017 |
| 2013/0123004 | A1 * | 5/2013 | Kruglick | A63F 13/67 463/43 |
| 2014/0267429 | A1 * | 9/2014 | Justice | G06T 1/20 345/520 |
| 2016/0219325 | A1 * | 7/2016 | Chu | A63F 13/35 |
| 2017/0115488 | A1 | 4/2017 | Ambrus et al. | |

FOREIGN PATENT DOCUMENTS

| | | |
|---|---|---|
| CN | 108351691 A | 7/2018 |
| CN | 108379832 A | 8/2018 |
| CN | 109304031 A | 2/2019 |
| IN | 109893857 A | 6/2019 |
| WO | 2019026765 A1 | 2/2019 |

* cited by examiner

RENDERING METHOD AND APPARATUS

CROSS-REFERENCE TO RELATED APPLICATIONS

This application is a National Stage of International Application No. PCT/CN2021/074693, filed on Feb. 1, 2021, which claims priority to Chinese Patent Application No. 202010108932.3, filed on Feb. 21, 2020. Both of the aforementioned applications are hereby incorporated by reference in their entireties.

TECHNICAL FIELD

This application relates to electronic technologies, and in particular, to a rendering method and apparatus.

BACKGROUND

Cloud gaming is a game manner based on cloud computing. All games run on a server. Video compression is performed on a rendered game image, and then a compressed game image is transmitted to a client through a network. A user watches the game image and operates a game on the client, and generated operation instructions are transmitted to the server through the network. The server responds to the operation instructions.

It can be learned that a processing delay of the cloud gaming is related to a communication feature of the network. Once the network fluctuates, the processing delay is prolonged, and game freezing occurs.

SUMMARY

Embodiments of this application provide a rendering method and apparatus, to shorten a processing delay and avoid image freezing.

According to a first aspect, this application provides a rendering method, including: receiving a first operation instruction from a user; rendering, according to the first operation instruction, a first image of an application corresponding to the first operation instruction; predicting a second operation instruction according to the first operation instruction; rendering, according to the second operation instruction, a second image of the application corresponding to the second operation instruction; and if no operation instruction is received from the user within preset duration after the first operation instruction is received, sending a rendered second image to the user.

In this application, when uplink communication of a communications network between a server and a terminal device is unstable (the terminal device sends data to the server), the server predicts a user operation, so that image switching caused by the user operation can be rendered in advance, thereby shortening a processing delay and avoiding image freezing.

In a possible implementation, the predicting a second operation instruction according to the first operation instruction includes: predicting the second operation instruction according to the first operation instruction by using an artificial intelligence method.

In this application, an operation instruction of the user is predicted by using the artificial intelligence method, so that accuracy of a prediction result can be improved.

In a possible implementation, the rendering a first image of an application corresponding to the first operation instruction includes: determining the first image, and rendering the first image.

In a possible implementation, the rendering a second image of the application corresponding to the second operation instruction includes: determining the second image, and rendering the second image.

In a possible implementation, the preset duration is 100 ms or 150 ms.

In this application, if no operation instruction is received from a client within a relatively short time, an image is rendered based on a prediction result, so that image freezing can be avoided.

According to a second aspect, this application provides an application server, including a receiving module, a rendering module, a prediction module, and a sending module. The receiving module is configured to receive a first operation instruction from a user. The rendering module is configured to render, according to the first operation instruction, a first image of an application corresponding to the first operation instruction. The prediction module is configured to predict a second operation instruction according to the first operation instruction. The rendering module is further configured to render, according to the second operation instruction, a second image of the application corresponding to the second operation instruction. The sending module is configured to: if no operation instruction is received from the user within preset duration after the first operation instruction is received, send a rendered second image to the user.

In a possible implementation, the prediction module is specifically configured to predict the second operation instruction according to the first operation instruction by using an artificial intelligence method.

In a possible implementation, the rendering module is specifically configured to: determine the first image, and render the first image.

In a possible implementation, the rendering module is specifically configured to: determine the second image, and render the second image.

In a possible implementation, the preset duration is 100 ms or 150 ms.

According to a third aspect, this application provides a server, including: one or more processors; and a memory, configured to store one or more programs. When the one or more programs are executed by the one or more processors, the one or more processors are enabled to implement the method according to any one of the implementations of the first aspect.

According to a fourth aspect, this application provides a computer-readable storage medium, including a computer program. When the computer program is executed by a computer, the computer is enabled to perform the method according to any one of the implementations of the first aspect and the second aspect.

According to a fifth aspect, this application provides a computer program. When the computer program is executed by a computer, the computer is enabled to perform the method according to any one of the implementations of the first aspect and the second aspect.

DETAILED DESCRIPTION OF ILLUSTRATIVE EMBODIMENTS

To make the objectives, technical solutions, and advantages of this application clearer, the following clearly describes the technical solutions in this application with reference to the accompanying drawings in this application. Obviously, the described embodiments are a part rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, terms "first", "second", and the like are merely intended for distinguishing and description, and shall not be understood as an indication or implication of relative importance or an indication or implication of an order. In addition, terms "include", "have", and any variant thereof are intended to cover non-exclusive inclusion, for example, include a series of steps or units. Methods, systems, products, or devices do not need to be limited to those steps or units that are clearly listed, but may include other steps or units that are not clearly listed or inherent to these processes, methods, products, or devices.

It should be understood that in this application, "at least one (item)" means one or more and "a plurality of" means two or more. A term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. In addition, "at least one of the following items (pieces)" or a similar expression thereof means any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

Figure 1:
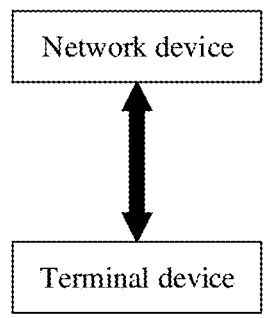
FIG. 1 is a schematic diagram of an example structure of a communications system.

FIG. 1 is a schematic diagram of an example structure of a communications system. As shown in FIG. 1, the communications system includes one server and one terminal device. Optionally, the communications system may further include a plurality of servers, and coverage of each server may include another quantity of terminal devices. This is not limited in this application. Optionally, the communications system may further include another network entity such as a network controller and a switching device. This application is not limited thereto. A black arrow in FIG. 1 indicates that there is a communication connection between the server and the terminal device. To be specific, data transmission may be implemented between the server and the terminal device through a communications network.

It should be noted that the communications network may be a local area network, or may be a wide area network transferred by using a relay (relay) device, or may include a local area network and a wide area network. For example, when the communications network is a local area network, the communications network may be a short-range communications network such as a Wi-Fi hotspot network, a Wi-Fi P2P network, a Bluetooth network, a ZigBee network, or a near field communication (near field communication, NFC) network. For example, when the communications network is a wide area network, the communications network may be a third generation mobile communications technology (3rd generation mobile communications technology, 3G) network, a fourth generation mobile communications technology (4th generation mobile communications technology, 4G) network, a fifth generation mobile communications technology (5th generation mobile communications technology, 5G) network, a future evolved public land mobile network (public land mobile network, PLMN), or the internet. This is not limited in this embodiment of this application.

It should be understood that, for ease of understanding, FIG. 1 shows only an example of one communications system, but this should not constitute any limitation on this application. The communications system may further include more servers, or may include more terminal devices. Servers that communicate with different terminal devices may be a same server or may be different servers. Quantities of servers that communicate with different terminal devices may be the same or may be different. This is not limited in this application.

Figure 2:
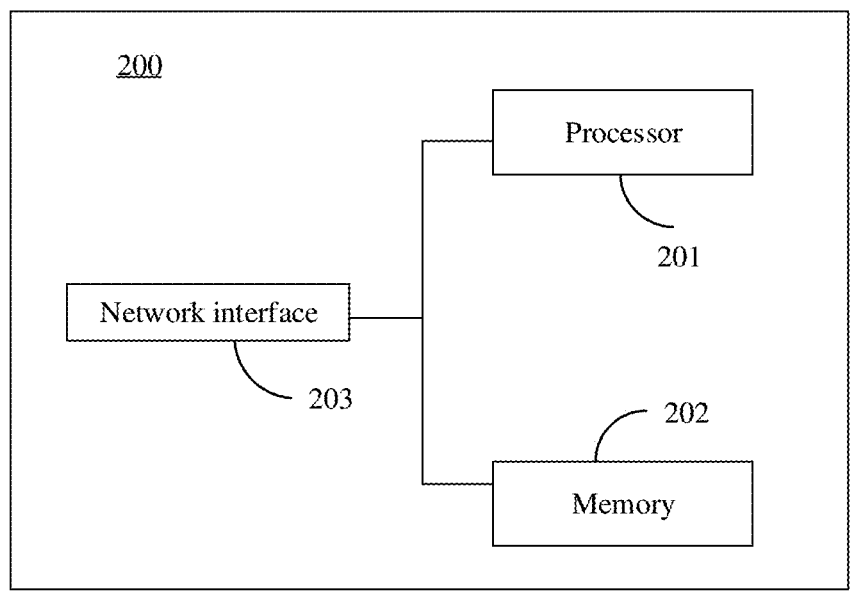
FIG. 2 is a schematic diagram of an example structure of a server 200.

It should be further understood that the server in the communications system may be any device that has a transceiver function or a chip that can be disposed in the device. FIG. 2 is a schematic diagram of an example structure of a server 200. For a structure of the server 200, refer to the structure shown in FIG. 2.

The server includes at least one processor 201, at least one memory 202, and at least one network interface 203. The processor 201, the memory 202, and the network interface 203 are connected, for example, through a bus. In this application, the connection may include various types of interfaces, transmission lines, buses, or the like. This is not limited in this embodiment. The network interface 203 is configured to enable the server to be connected to another communications device such as an Ethernet interface through a communications link.

The processor 201 is mainly configured to: process communication data, control the entire server, execute a software program, and process data of the software program, for example, configured to support the server in performing actions described in embodiments. The processor 201 is mainly configured to control the entire server, execute the software program, and process the data of the software program. A person skilled in the art may understand that the server may include a plurality of processors to enhance a processing capability of the server, and components of the server may be connected through various buses. The processor 201 may also be expressed as a processing circuit or a processor chip.

The memory 202 is mainly configured to store the software program and data. The memory 202 may exist independently, or may be connected to the processor 201. Optionally, the memory 202 and the processor 201 may be integrated, for example, integrated into a chip. The memory 202 can store program code for executing the technical solutions of this application, and the processor 201 controls execution of the program code. Various types of executed computer program code may also be considered as drivers of the processor 201.

FIG. 2 shows only one memory and one processor. In an actual server, there may be a plurality of processors and a plurality of memories. The memory may also be referred to as a storage medium, a storage device, or the like. The memory may be a storage element located on a same chip as the processor, that is, an on-chip storage element, or an independent storage element. This is not limited in this application.

It should be further understood that the terminal device in the communications system may also be referred to as user equipment (user equipment, UE). The terminal device may be deployed on land, including an indoor or outdoor device, a handheld device, or a vehicle-mounted device; or may be deployed on the water (for example, on a ship); or may be deployed in the air (for example, on an airplane, a balloon, or a satellite). The terminal device may be a mobile phone (mobile phone), a tablet (pad), a wearable device (such as a smartwatch) having a wireless communication function, a location tracker having a positioning function, a computer having a wireless transceiver function, a virtual reality (virtual reality, VR) device, an augmented reality (augmented reality, AR) device, a wireless device in a smart home (smart home), or the like. This is not limited in this application. In this application, the foregoing terminal device and the chip that can be disposed in the foregoing terminal device are collectively referred to as a terminal device.

Figure 3:
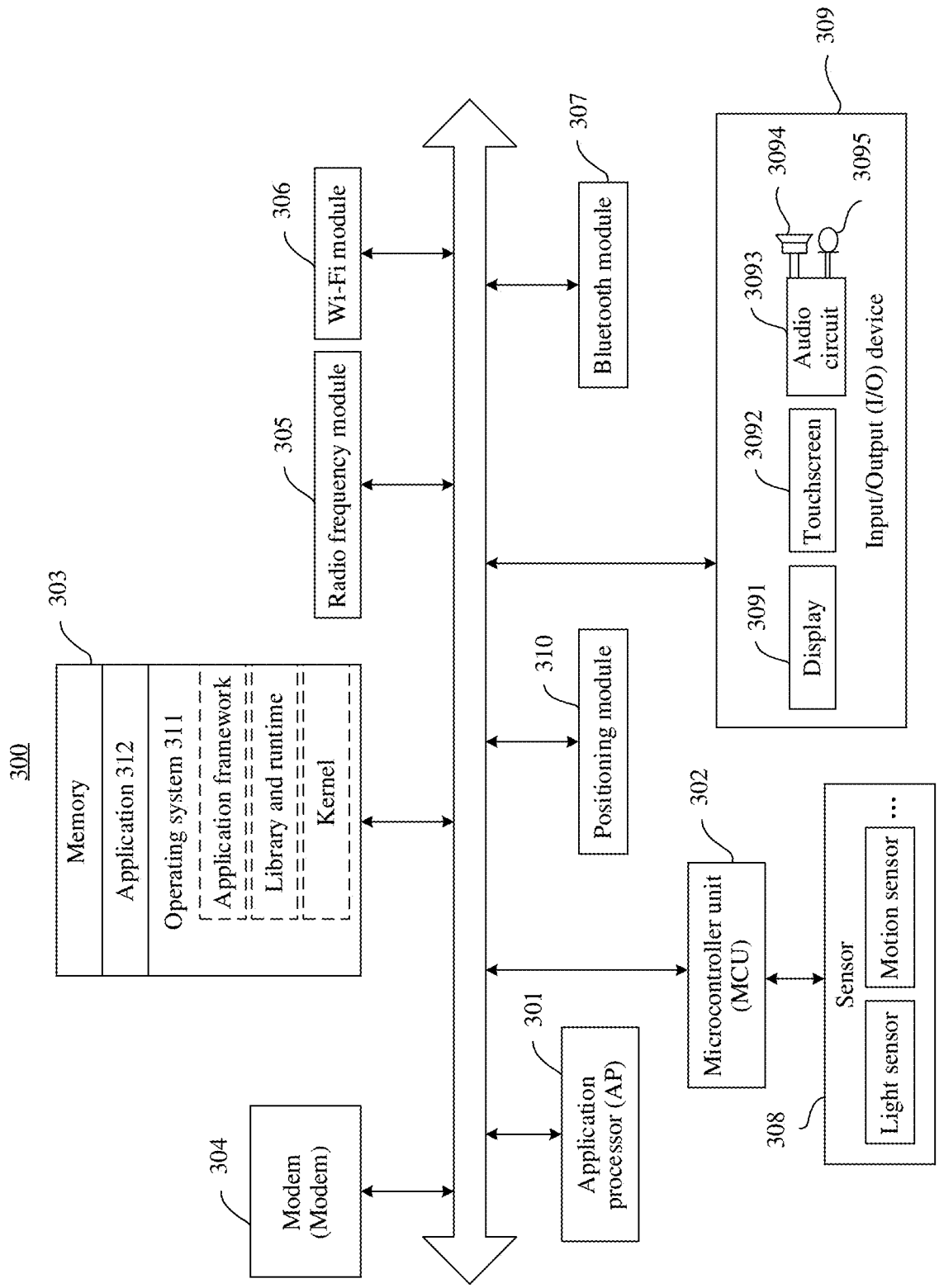
FIG. 3 is a schematic diagram of an example structure of a terminal device 300.

FIG. 3 is a schematic diagram of an example structure of a terminal device 300. As shown in FIG. 3, the terminal device 300 includes components such as an application processor 301, a microcontroller unit (microcontroller unit, MCU) 302, a memory 303, a modem (modem) 304, a radio frequency (radio frequency, RF) module 305, a wireless fidelity (wireless fidelity, Wi-Fi for short) module 306, a Bluetooth module 307, a sensor 308, an input/output (input/output, I/O) device 309, and a positioning module 310. These components can communicate with each other through one or more communications buses or signal lines. The communications bus or the signal line may be a CAN bus provided in this application. A person skilled in the art may understand that the terminal device 300 may include more or fewer components than those shown in the figure, or combine some components, or have different component arrangements.

The following describes each component of the terminal device 300 in detail with reference to FIG. 3.

The application processor 301 is a control center of the terminal device 300, and is connected to the components of the terminal device 300 through various interfaces and buses. In some embodiments, the processor 301 may include one or more processing units.

The memory 303 stores a computer program, such as an operating system 311 and an application 312 shown in FIG. 3. The application processor 301 is configured to execute the computer program in the memory 303, to implement a function defined by the computer program. For example, the application processor 301 executes the operating system 311, to implement various functions of the operating system on the terminal device 300. The memory 303 further stores other data in addition to the computer program, such as data generated during running of the operating system 311 and the application 312. The memory 303 is a nonvolatile storage medium, and generally includes an internal memory and an external memory. The internal memory includes but is not limited to a random access memory (random access memory, RAM), a read-only memory (read-only memory, ROM), a cache (cache), and the like. The external memory includes but is not limited to a flash memory (flash memory), a hard disk, a compact disc, a universal serial bus (universal serial bus, USB) flash drive, and the like. The computer program is usually stored in the external memory. Before executing the computer program, the processor loads the program from the external memory to the internal memory.

The memory 303 may be independent, and is connected to the application processor 301 through a bus; or the memory 303 and the application processor 301 may be integrated into a chip subsystem.

The MCU 302 is a coprocessor configured to obtain and process data from the sensor 308. A processing capability and power consumption of the MCU 302 are lower than those of the application processor 301, but the MCU 302 has a feature of "always on (always on)", and can continuously collect and process sensor data when the application processor 301 is in a sleep mode, so as to ensure normal running of the sensor with relatively low power consumption. In an embodiment, the MCU 302 may be a sensor hub chip. The sensor 308 may include a light sensor and a motion sensor. Specifically, the light sensor may include an ambient light sensor and a proximity sensor. The ambient light sensor may be used to adjust luminance of a display 3091 based on brightness of ambient light, and when the terminal device 300 approaches an ear, the proximity sensor may power off the display. As one of motion sensors, an accelerometer sensor may detect a value of an acceleration in each direction (generally three axes), and may detect a value and a direction of gravity when the accelerometer sensor is stationary. The sensor 308 may further include another sensor such as a gyroscope, a barometer, a hygrometer, a thermometer, or an infrared sensor. Details are not described herein again. The MCU 302 and the sensor 308 may be integrated into a same chip, or may be separate components, and are connected through a bus.

The modem 304 and the radio frequency module 305 constitute a communications subsystem of the terminal device 300, and are configured to implement main functions of a wireless communications standard protocol. The modem 304 is configured to perform coding/decoding, signal modulation/demodulation, equalization, and the like. The radio frequency module 305 is configured to receive and send a radio signal, and the radio frequency module 305 includes but is not limited to an antenna, at least one amplifier, a coupler, a duplexer, and the like. The radio frequency module 305 cooperates with the modem 304 to implement a wireless communication function. The modem 304 may be used as an independent chip, or may be combined with another chip or circuit to form a system-level chip or an integrated circuit. The chip or integrated circuit may be applied to all terminal devices that implement wireless communication functions, including a mobile phone, a computer, a notebook computer, a tablet, a router, a wearable device, a vehicle, a household appliance, and the like.

The terminal device 300 may further perform wireless communication by using the Wi-Fi module 306, the Bluetooth module 307, or the like. The Wi-Fi module 306 is configured to provide the terminal device 300 with network access that complies with a Wi-Fi related standard protocol. The terminal device 300 may access a Wi-Fi access point by using the Wi-Fi module 306, to access the internet. In some other embodiments, the Wi-Fi module 306 may alternatively be used as a Wi-Fi wireless access point, and may provide Wi-Fi network access for another terminal device. The Bluetooth module 307 is configured to implement short-range communication between the terminal device 300 and another terminal device (for example, a mobile phone or a smartwatch). In this application, the Wi-Fi module 306 may be an integrated circuit, a Wi-Fi chip, or the like, and the Bluetooth module 307 may be an integrated circuit, a Bluetooth chip, or the like.

The positioning module 310 is configured to determine a geographical location of the terminal device 300. It may be understood that the positioning module 310 may be specifically a receiver of a positioning system such as a global positioning system (global position system, GPS), a BeiDou navigation satellite system, or a Russian GLONASS.

The Wi-Fi module 306, the Bluetooth module 307, and the positioning module 310 may be separate chips or integrated circuits, or may be integrated together. For example, in an embodiment, the Wi-Fi module 306, the Bluetooth module 307, and the positioning module 310 may be integrated into a same chip. In another embodiment, the Wi-Fi module 306, the Bluetooth module 307, the positioning module 310, and the MCU 302 may alternatively be integrated into a same chip.

The input/output device 309 includes but is not limited to the display 3091, a touchscreen 3092, an audio circuit 3093, and the like.

The touchscreen 3092 may collect a touch event of a user of the terminal device 300 on or near the touchscreen 3092 (for example, an operation performed by the user on the touchscreen 3092 or near the touchscreen 3092 by using any proper object such as a finger or a stylus), and send the collected touch event to another component (for example, the application processor 301). The operation performed by the user near the touchscreen 3092 may be referred to as a floating touch. Through the floating touch, the user may select, move, or drag a target (for example, an icon) without directly touching the touchscreen 3092. In addition, the touchscreen 3092 may be implemented by using a plurality of types such as a resistive type, a capacitive type, infrared, and a surface acoustic wave.

The display (also referred to as a display) 3091 is configured to display information entered by the user or information displayed to the user. The display may be configured in a form such as a liquid crystal display or an organic light-emitting diode. The touchscreen 3092 may cover the display 3091. After detecting a touch event, the touchscreen 3092 transmits the touch event to the application processor 301 to determine a type of the touch event. Then, the application processor 301 may provide a corresponding visual output on the display 3091 based on the type of the touch event. In FIG. 3, the touchscreen 3092 and the display 3091 are used as two independent components to implement input and output functions of the terminal device 300. However, in some embodiments, the touchscreen 3092 and the display 3091 may be integrated to implement the input and output functions of the terminal device 300. In addition, the touchscreen 3092 and the display 3091 may be configured on a front side of the terminal device 300 in a full panel form, to implement a bezel-less structure.

The audio circuit 3093, a speaker 3094, and a microphone 3095 may provide an audio interface between the user and the terminal device 300. The audio circuit 3093 may transmit an electrical signal into which received audio data is converted to the speaker 3094, and the speaker 3094 converts the electrical signal into a sound signal for output. In addition, the microphone 3095 converts a collected sound signal into an electrical signal, the audio circuit 3093 receives the electrical signal, converts the electrical signal into audio data, and then sends the audio data to, for example, another terminal device by using the modem 304 and the radio frequency module 305, or outputs the audio data to the memory 303 for further processing.

In addition, the terminal device 300 may further have a fingerprint recognition function. For example, a fingerprint collection component may be configured on a back side of the terminal device 300 (for example, below a rear-facing camera), or a fingerprint collection component may be configured on the front side of the terminal device 300 (for example, below the touchscreen 3092). For another example, a fingerprint collection component may be configured in the touchscreen 3092 to implement the fingerprint recognition function. To be specific, the fingerprint collection component may be integrated with the touchscreen 3092 to implement the fingerprint recognition function of the terminal device 300. In this case, the fingerprint collection component is configured in the touchscreen 3092, and may be a part of the touchscreen 3092, or may be configured in the touchscreen 3092 in another manner. A main part of the fingerprint collection component in this application is a fingerprint sensor, and the fingerprint sensor may use any type of sensing technology, including but not limited to an optical sensing technology, a capacitive sensing technology, a piezoelectric sensing technology, an ultrasonic wave sensing technology, and the like.

The terminal device 300 may be logically divided into a hardware layer, the operating system 311, and an application layer. The hardware layer includes hardware resources such as the application processor 301, the MCU 302, the memory 303, the modem 304, the Wi-Fi module 306, the sensor 308, and the positioning module 310. The operating system 311 on which the terminal device 300 runs may be iOS®, Android®, Microsoft®, or another operating system. This is not limited in this application.

Figure 4:
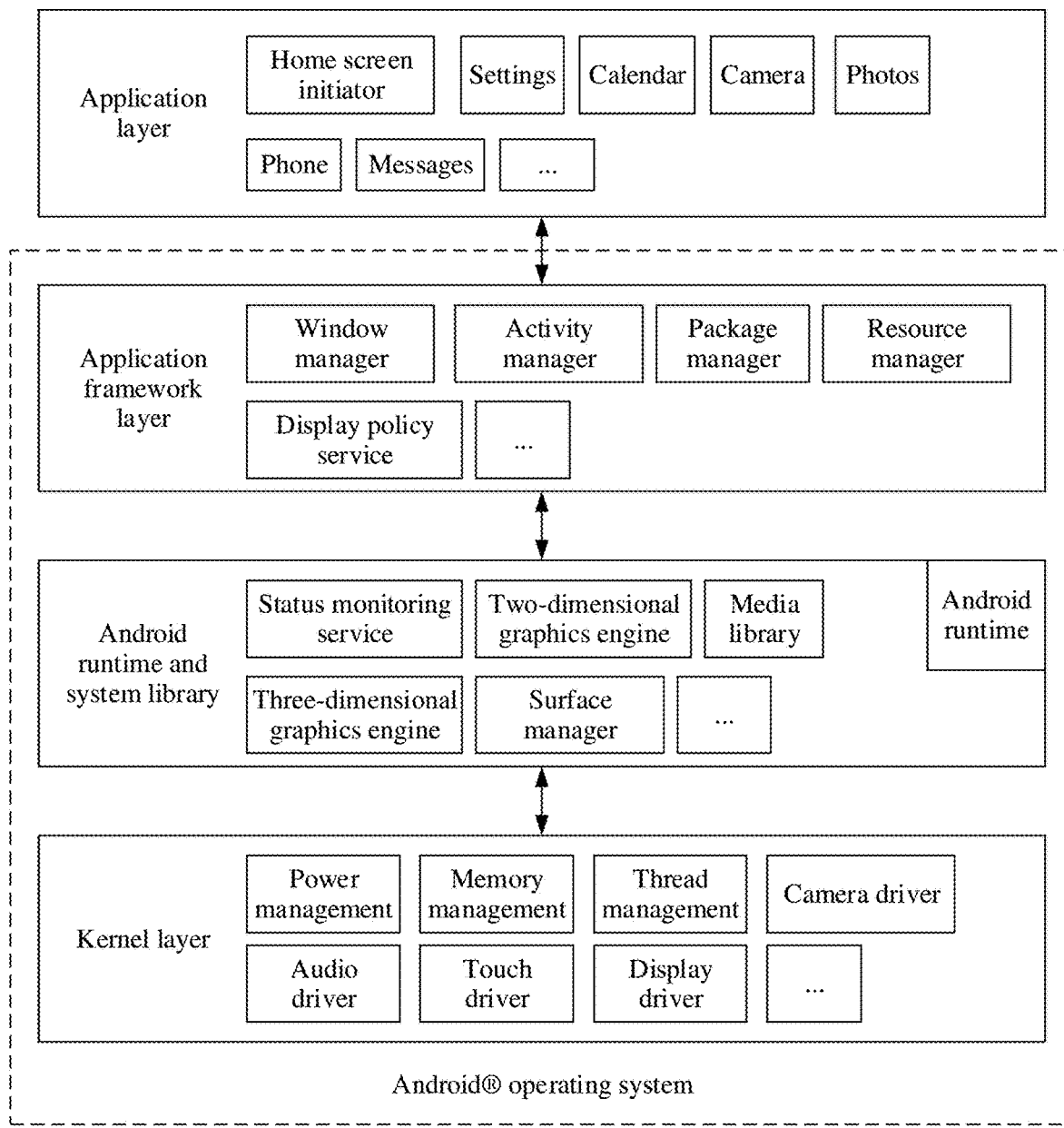
FIG. 4 is a schematic diagram of an example structure of a software layer of a terminal device 300.

The operating system 311 and the application layer may be collectively referred to as a software layer of the terminal device 300. FIG. 4 is a schematic diagram of an example structure of the software layer of the terminal device 300. As shown in FIG. 4, the Android® operating system is used as an example. As software middleware between the hardware layer and the application layer, the operating system is a computer program that manages and controls hardware and software resources.

The application layer includes one or more applications, and the application may be an application of any type such as a social application, an e-commerce application, or a browser, for example, Home screen initiator, Settings, Calendar, Camera, Photos, Phone, and Messages.

The Android® operating system includes a kernel layer, an Android runtime and a system library, and an application framework layer. The kernel layer is configured to provide an underlying system component and a service, for example, power management, memory management, thread management, and a hardware driver. The hardware driver includes a display driver, a camera driver, an audio driver, a touch driver, and the like. The kernel layer encapsulates a kernel driver, provides an interface for the application framework layer, and shields an implementation detail of a lower layer.

The Android runtime and the system library provide a library file and an execution environment required by an executable program during running. A virtual machine or a virtual machine instance that can convert bytecode of an application into machine code. The system library is a program library that provides support for the executable program during running, and includes a two-dimensional graphics engine, a three-dimensional graphics engine, a media library, a surface manager, a status monitoring service, and the like.

The application framework layer is configured to provide various basic common components and services for an application at the application layer, including a window manager, an activity manager, a package manager, a resource manager, a display policy service, and the like.

Functions of the components of the operating system 311 described above may be implemented by the application processor 301 by executing the program stored in the memory 303.

A person skilled in the art may understand that the terminal device 300 may include fewer or more components than those shown in FIG. 3, and the terminal device shown in FIG. 3 includes only components more related to a plurality of implementations disclosed in this application.

A rendering method provided in this application is applicable to the communications system shown in FIG. 1. The server may be a server of a provider of a cloud computing-based application (application, APP). It should be noted that the foregoing app may use a client-server (client-server, C/S) structure. A client installed on the terminal device of the user is responsible for interacting with the user, and sending, to a server, an operation instruction generated when the user performs an operation on an operation interface of the app. The server is responsible for managing app data, responding to the operation instruction from the client, and rendering an image displayed on the client.

For example, the app in this application may be Cloud Gaming. Cloud gaming is a game manner based on cloud computing (cloud computing). In a running mode of the cloud gaming, all games run on the server, and the server performs video compression on a rendered game image and transmits the compressed image to the client through a network. On the client, the terminal device only needs a basic video decompression capability instead of a high-end processor or a graphics card. The cloud computing is an internet-based computing mode. In this mode, shared software and hardware resources and information can be provided for the terminal device as required. A network that provides the resource is referred to as "cloud". The cloud gaming is independent of hardware. For the server, only server performance needs to be improved without developing a new host. For the client, higher image quality can be obtained without using a high-performance terminal device. Generally, a process of the cloud gaming is as follows: The user first operates the terminal device to be connected to a transmission server and select a game, and then the transmission server sends information about the selected game to a game server. In this case, the terminal device of the user may obtain a uniform resource locator (uniform resource locator, URL) of the game server, and be connected to the game server by using the URL to start the game.

For another example, the app in this application may be Maps. Maps runs and plans a route on the server. After video compression is performed, a rendered map image is transmitted to the client through the network. The user watches the map image and a walking route by using a terminal device on which the client is installed, and performs an operation on the map image to facilitate viewing.

For another example, the app in this application may be Document Editing. Document Editing performs editing and managing on the server. After video compression is performed, a rendered document image is transmitted to the client through the network. The user views a document page by using a terminal device on which the client is installed, and performs an operation on the document page to move a related page element.

For another example, the app in this application may further include Cloud IoT, Cloud Identity, Cloud Storage, or Cloud Security. This is not specifically limited.

Figure 5:
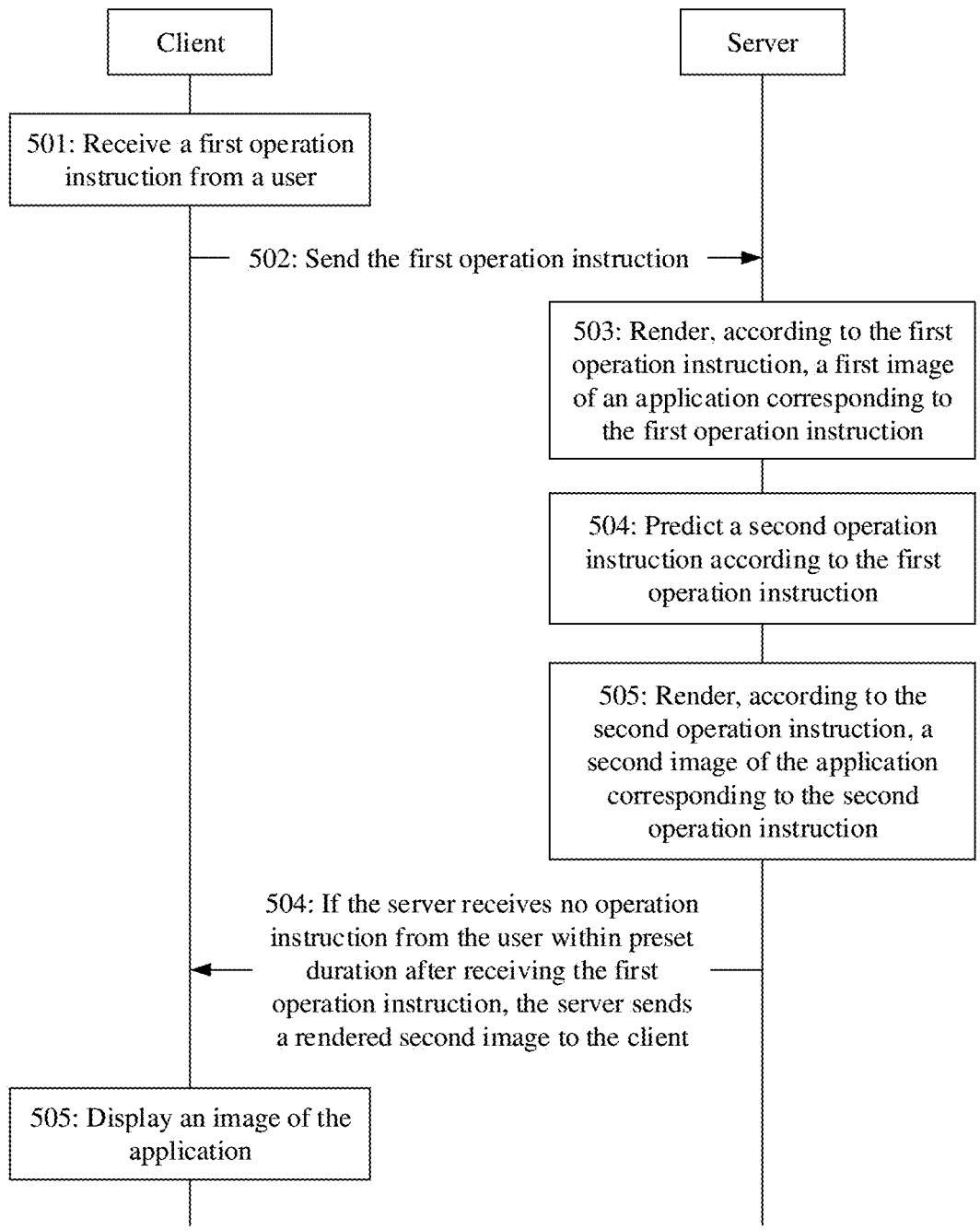
FIG. 5 is a flowchart of a rendering method embodiment according to this application.

FIG. 5 is a flowchart of a rendering method embodiment according to this application. As shown in FIG. 5, the method in this embodiment may be applied to the communications system shown in FIG. 1. The rendering method may include the following steps.

Step 501: A client receives a first operation instruction from a user.

The first operation instruction is an instruction generated by a user operation. As described above, a cloud computing-based app usually uses a C/S structure. To use this type of app, the user needs to first install a client of the app on a terminal device, and then tap an icon of the app to enable the client. The client is connected to a server by using a communication function of the terminal device and starts to run. The client may store a large quantity of resources in the app. The user enters an operation instruction by using the client, and the client translates the operation instruction into data and sends the data to the server. After processing the data according to the operation instruction, the server obtains a processing result and sends the processing result to the client. The client graphically displays the processing result on a screen of the terminal device. The client may be referred to as an intermediary between the user and the server. It can be learned that, during running of the app, regardless of an operation performed by the user on the client, based on a principle of the foregoing cloud computing-based app, the client performs translation based on a user operation (that is, generates an operation instruction that can be identified by the server). Usually, the user operation may include an operation such as tapping, dragging, sliding, or touching and holding on a touchscreen of a smart device, or may include an operation such as clicking or dragging performed by using a mouse of a computer, an input operation on a keyboard, or the like, or may include a related operation on another input device, or the like. This is not specifically limited in this application.

Step 502: The client sends the first operation instruction to the server.

After obtaining the corresponding first operation instruction based on the user operation, the client sends the first operation instruction to the server through a communications network between the terminal device and the server.

In this application, the user may send the first operation instruction to the server by using clients installed on different terminal devices. For example, when walking on a road, the user sends a first operation instruction by using a client installed on a mobile phone, and immediately switches to a computer to continue playing a game after returning home. In this way, a subsequent first operation instruction is sent to the server by using a client installed on the computer. The first operation instructions are from different terminal devices but correspond to a same user. Correspondingly, destinations to which the server sends a rendered image may also correspond to different terminal devices. For example, if the user sends the first operation instruction by using the client installed on the mobile phone, the server sends a rendered image to the mobile phone of the user; if the user sends the first operation instruction by using the client installed on the computer, the server sends a rendered image to the computer of the user. However, the first operation instructions correspond to a same user, and game smoothness is not affected.

Step 503: The server renders, according to the first operation instruction, a first image of an application corresponding to the first operation instruction.

Step 504: The server predicts a second operation instruction according to the first operation instruction.

Step 505: The server renders, according to the second operation instruction, a second image of the application corresponding to the second operation instruction.

In this application, if the user operation triggers image switching of the application, for example, switching from an image a to an image b, both the image a and the image b are sent to the client through video compression after the server completes rendering, and are displayed on the screen of the terminal device after the client performs video decompression. That is, any image displayed on the screen of the terminal device that runs the client is obtained through rendering by the server. Therefore, the server needs to know an image change caused by the user operation.

Usually, after receiving the operation instruction from the client, the server performs corresponding processing according to the operation instruction, and when the operation instruction causes image switching, the server triggers the image switching according to the operation instruction, and renders a switched image. For example, the operation instruction represents that a target character walks from a first location to a second location, and a scene in which the target character is located changes in a movement process. In this case, image switching from an image corresponding to the first location to an image corresponding to the second location is caused. After obtaining the operation instruction, the server needs to render the image corresponding to the second location. For another example, the operation instruction represents switching from a first document to a second document or switching from a first page to a second page of a document, and the document switching causes a page displayed on the screen to change. In this case, image switching is caused. After obtaining the operation instruction, the server needs to render an image corresponding to the second document or the second page.

The server may further predict a possible future user operation according to a currently received operation instruction, determine, based on the predicted user operation, whether the prediction operation causes image switching, and render a switched image in advance. For example, the operation instruction received by the server represents that the target character walks from the first location to the second location, and it may be predicted that the target character may walk from the second location to a third location. Based on the prediction result, before actually receiving an operation instruction from the client, the server may render an image corresponding to the third location in advance. Subsequently, if the received operation instruction represents that the target character walks from the second location to the third location, it indicates that the previous prediction made by the server is accurate, and the server may directly send a rendered image corresponding to the third location to the client, thereby shortening a rendering time. If the received operation instruction represents that the target character walks from the second location to a fourth location, it indicates that the previous prediction made by the server is not accurate, and the server may render, according to the received operation instruction, an image corresponding to the fourth location. However, the previous rendering on the image corresponding to the third position may be discarded.

The server may first render an image of a corresponding application according to an operation instruction from the user, then predict a user operation according to the operation instruction, and perform image rendering based on a prediction result. When computing power is sufficient or smoothness on a user side is not affected, the server processes the foregoing actions in parallel, for example, first makes a prediction, and then performs corresponding rendering according to both a received operation instruction and a predicted operation instruction; or first simultaneously performs rendering according to a received operation instruction and makes a prediction, and then performs rendering on a prediction result; or performs processing in another possible order.

If the communications network between the server and the terminal device is unstable, an operation instruction sent by the client may not be received by the server in time, or even the operation instruction is lost, and the server cannot receive the operation instruction. In this case, the server cannot perform image rendering according to the operation instruction from the client. Consequently, image freezing, discontinuity, or the like occurs on the screen of the terminal device. Based on the foregoing prediction operation of the server, the server renders a to-be-switched-to image in advance. Once finding that no operation instruction is received from the client within preset duration (for example, 100 ms or 150 ms), the server may send a rendered image to the client. Even if the foregoing communications network is unstable, the client may still continuously receive compressed video data, decompress the compressed video data, and display decompressed video data on the screen. This maintains image continuity.

Optionally, to reduce a workload of the server, the server does not need to perform a prediction operation all the time, but starts a timing mechanism. If the server receives no instruction, request, feedback information, handshake data, or the like from the client within a period of time (for example, 100 ms or 150 ms), it is considered that a link between the server and the terminal device is unstable, and the server may start a prediction operation for the client, and render a to-be-switched-to image based on a prediction result.

Optionally, if the server receives no instruction, request, feedback information, handshake data, or the like from the client after a period of time (for example, is), it is considered that the client is offline. In this case, the server does not need to provide a running service such as an app prediction operation for the client.

Figure 6:
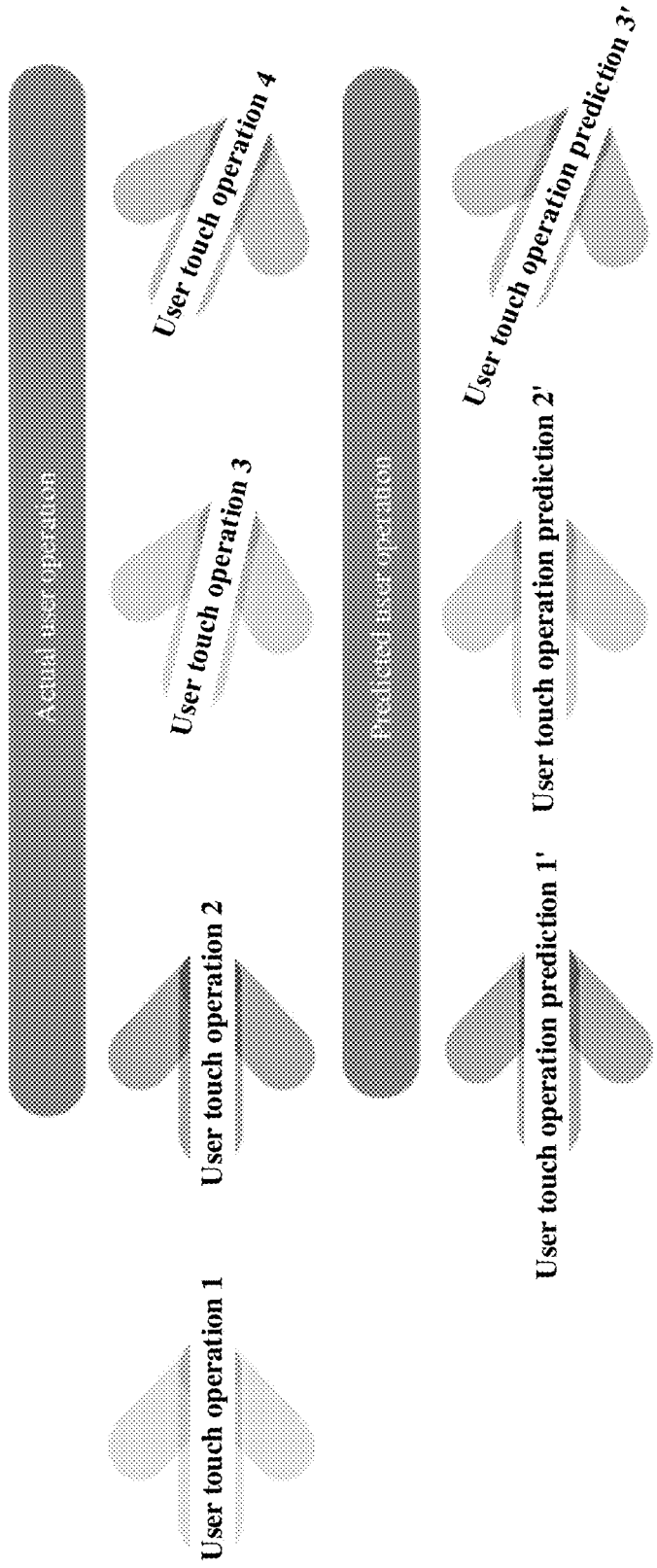
FIG. 6 is a schematic diagram of an example prediction process of a server.

It should be noted that the prediction operation of the server may be implemented by using a method such as artificial intelligence, a neural network, or model training. This is not specifically limited herein. FIG. 6 is a schematic diagram of an example prediction process of the server. As shown in FIG. 6, an actual operation performed by the user on the client includes user touch operations 1 to 4. Theoretically, the four operations generate four operation instructions, and the four operation instructions are sent by the client to the server one by one in an operation sequence. In this case, after receiving the operation instruction 1 generated by the user touch operation 1, the server may predict a possible future user operation according to the operation instruction 1, to obtain a user touch operation prediction 1, then obtain a user touch operation prediction 2 through prediction according to the operation instruction 1 and the user touch operation prediction 1, and further obtain a user touch operation prediction 3. It can be learned that the user touch operation prediction 1 is still very similar to or even the same as the actual user touch operation 2. However, if the server cannot obtain the subsequent operation instructions 2 to 4 in time subsequently, possible prediction results, that is, the user touch operation predictions 2 and 3, deviate from the actual user touch operations 3 and 4. However, even if there is such a prediction deviation, user experience is not affected. The prediction ensures image continuity, and the server does not stop image rendering even if the server receives no operation instruction from the client. In addition, if the communications network can be recovered to be stable quickly, the server can continue to receive an operation instruction from the client in a short time, and adjust a prediction result and a rendered image according to an actual operation instruction, and the user does not sense such a short-time deviation. Moreover, if the communications network cannot be recovered all the time, based on the foregoing mechanism, if the server receives no operation instruction from the client for a long time, the server no longer provides services such as data processing and image rendering for the client. In this case, the user on the client may also sense a problem of the communications network, and perform corresponding processing in time.

Step 506: If the server receives no operation instruction from the user within preset duration after receiving the first operation instruction, the server sends a rendered second image to the client.

As described above, after receiving an operation instruction, the server may perform rendering according to the operation instruction, to obtain a rendering result 1. The server may also predict a user operation according to the operation instruction, and perform rendering according to a prediction result, to obtain a rendering result 2. If the communications network is normal, the server sends the rendering result 1 to the client. If the communications network is unstable and uplink freezing occurs (for example, no user operation instruction is received within the preset time), the server sends the rendering result 2 to the client. The server may send the operation instruction to the client through the communications network between the terminal device and the server.

Step 507: The client displays an image of the application.

The client decompresses received compressed video data, and translates the data to obtain image data that can be identified by the terminal device, so as to display a corresponding image on the screen based on the obtained image data.

In this embodiment, when uplink communication of the communications network between the server and the terminal device is unstable (the terminal device sends data to the server), the server predicts a user operation, so that image switching caused by the user operation can be rendered in advance, thereby shortening a processing delay and avoiding image freezing.

For example, a cloud gaming app is used as an example to describe the rendering method provided in this application. It is assumed that the user installs a cloud gaming app on the terminal device, and the user enables the gaming app to enter a game interface, and plays a game by performing operations such as tapping, dragging, zooming, and touching and holding. When the user drags a game character to move during gaming, a game image changes as a location of the game character changes, so that the user experiences visual synchronization with the game character.

Figure 7:
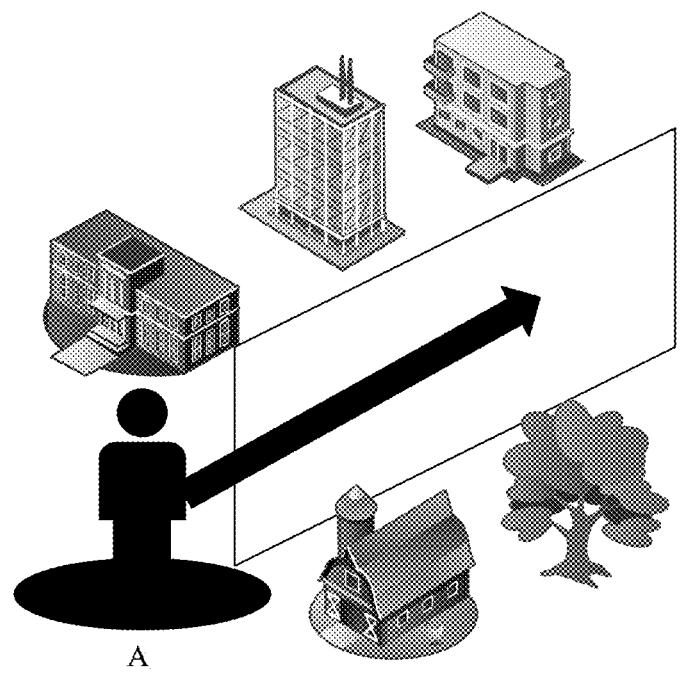
FIG. 7 to FIG. 11 are schematic diagrams of example cloud gaming image switching.

FIG. 7 to FIG. 11 are schematic diagrams of example cloud gaming image switching. As shown in FIG. 7, the game character stands at a point A. In this case, the client displays an image rendered by a cloud gaming server based on the point A at which the game character is located.

Figure 8:
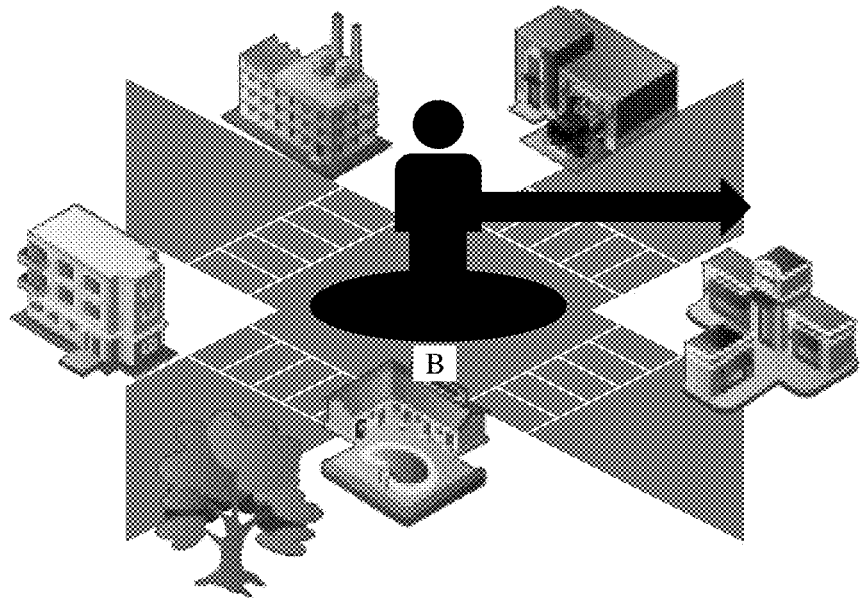

As shown in FIG. 8, the user drags the game character to move to a point B in an upper-right direction. An operation instruction generated in the operation process is transmitted to the server through a network. The server renders, based on a movement track of the game character indicated by the operation instruction, an image corresponding to the point B, and the image is transmitted to the client through the network and displayed to the user.

Figure 9:
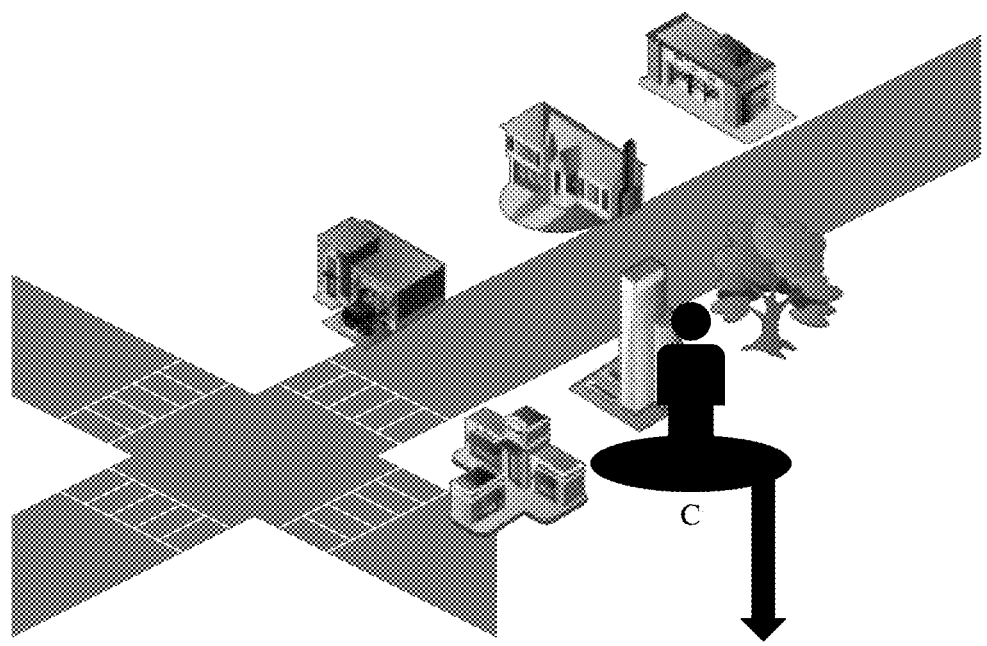

As shown in FIG. 9, the user drags the game character rightwards from the point B to a point C. In this case, an operation instruction generated in the operation process does not arrive at the server, and the server does not receive information from the client within a specified time, that is, it is considered that the instruction cannot be received in time due to network fluctuation. In this case, the server predicts, based on the previous operation that the user drags the game character from the point A to the point B, that the user may subsequently drag the game character from the point B to the point C. Therefore, the server renders, based on the prediction operation, an image corresponding to the point C, and the image is transmitted to the client through the network and displayed to the user. It can be learned that, even if the operation instruction generated when the user drags the game character rightwards to the point C is not received by the server, the server can still render a subsequent game image based on the user operation prediction, and the image is transmitted to the client through the network and displayed to the user. In this way, the user can watch continuously switched game images without freezing.

Figure 10:
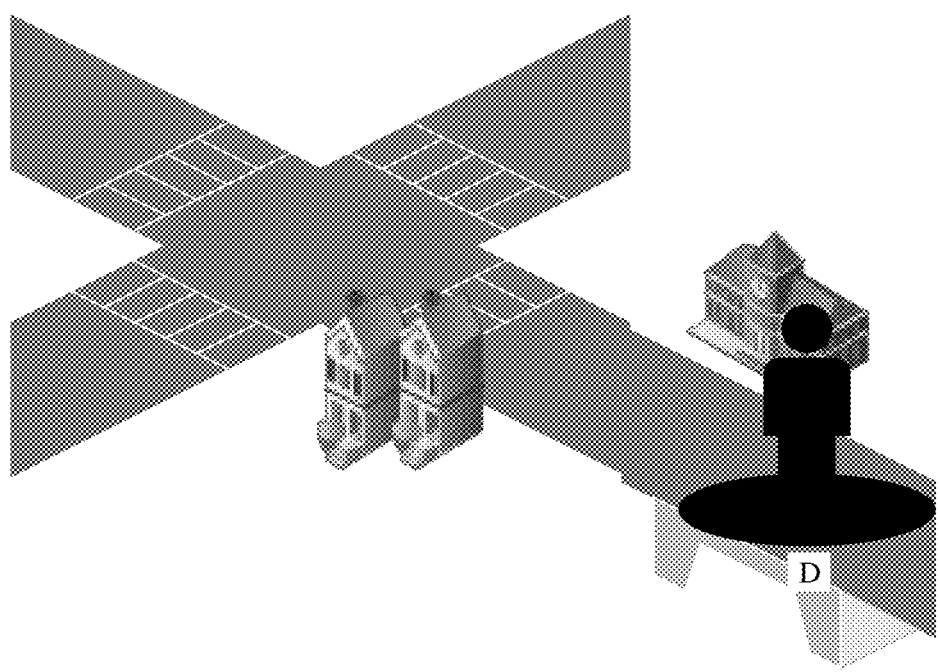

As shown in FIG. 10, the user drags the game character to move from the point B to a point D in a lower-right direction. In this case, an operation instruction generated in the operation process does not arrive at the server, and the server does not receive the operation instruction from the client within a specified time, that is, it is considered that the instruction cannot be received in time due to network fluctuation. In this case, the server predicts, based on the previous operation that the user drags the game character from the point A to the point B, that the user may subsequently drag the game character from the point B to the point C. Therefore, the server renders, based on the prediction operation, an image corresponding to the point C, and the image is transmitted to the client through the network and displayed to the user. However, a difference from FIG. 7 lies in that the prediction operation obtained by the server in FIG. 8 is inconsistent with an actual operation of the user, that is, the actual operation of the user is to drag the game character from the point B to the point D, but the prediction operation of the server is to drag the game character from the point B to the point C, and a rendered image is the image corresponding to the point C. Similarly, the user can watch continuously switched game images without freezing.

Figure 11:
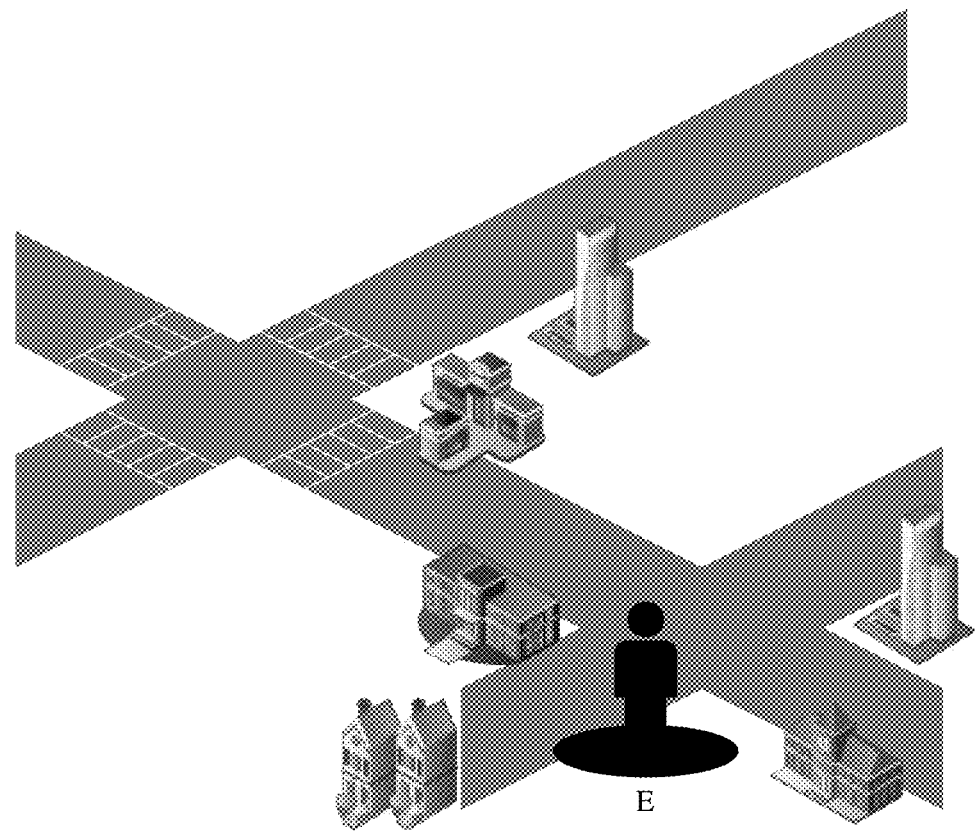

As shown in FIG. 11, the user drags the game character to move downwards from the point C to a point E. An operation instruction generated in the operation process is transmitted to the server through the network, and the server may further receive the operation instruction, indicating that a network condition is well recovered. In this case, the server may further render, based on a movement track of the game character indicated by the operation instruction, an image corresponding to the point E, and the image is transmitted to the client through the network and displayed to the user. In this way, the server switches back to perform image rendering according to the operation instruction from the client. This does not affect game picture continuity.

In the foregoing process, the user holds the terminal device, the game interface is displayed on the screen of the terminal device, and the user may perform operations such as tapping, dragging, zooming, and touching and holding on the touchscreen of the terminal device. After these operations are obtained by the client installed on the terminal device, corresponding operation instructions are generated. The client transmits the operation instructions to the server through the network. The server receives the operation instructions, and predicts user behavior according to the operation instructions, to predict subsequent user operations. It should be noted that the server may periodically predict a user operation based on a received operation instruction, or the server may predict a user operation according to an existing operation instruction provided that the server receives an operation instruction from the client, or the server may predict a user operation when detecting network fluctuation. This is not specifically limited in this application.

In this application, the server may predict a user operation by using a plurality of methods. For example, the server performs fitting according to an operation instruction already generated by the user and a historical dragging operation of the user, to predict a location at which the user performs a next operation. This is not specifically limited in this application.

When the network condition is good, after obtaining a prediction operation, the server renders a corresponding image according to an operation instruction from the client instead of the prediction operation, and the server renders a corresponding image based on the prediction operation only when the network fluctuates. In this application, the server may determine the network fluctuation based on a receiving status of handshake data and control signaling information between the server and the client. For example, for an acknowledgment (Acknowledgment, ACK) fed back by the client, the server sets a timer, and duration of the timer is, for example, 100 ms. Each time the server receives an ACK fed back by the client, the server resets the timer. If the server does not receive a next ACK when the timer times out, the server considers that data is lost, indicating that the network fluctuation occurs and a channel condition is poor.

In addition, after determining the network fluctuation and starting image rendering based on a prediction operation, the server further needs to set another timer, and duration of the timer is, for example, 1 s. An objective of the timer is that, if the user disables the cloud gaming app or powers off the terminal device or the user holds the terminal device and enters an area without a mobile service, the server does not need to continue to render a game image for the client. Once the timer times out, neither the operation instruction nor the prediction operation may trigger the server to perform image rendering for the client.

When the network fluctuates, the server performs image rendering based on a prediction operation. Because the prediction operation is obtained through prediction according to an existing operation instruction and a game image, the prediction operation cannot completely comply with an actual operation of the user. As shown in FIG. 8, the actual operation of the user is to drag the game character from the point B to the point D, but the prediction operation of the server is to drag the game character from the point B to the point C. In other words, an image rendered by the server may not be a corresponding image obtained after the actual operation of the user. However, as described above, after determining the network fluctuation, the server only sets that the rendering method provided in this application is performed within a period of time. Once the second timer times out, the server considers that the client is offline, and does not need to provide game processing and image rendering for the client. Therefore, as long as the second timer does not time out, the server can quickly switch back to perform image rendering according to an operation instruction from the client, and a rendering deviation in a short time does not affect viewing experience of the user.

Figure 12:
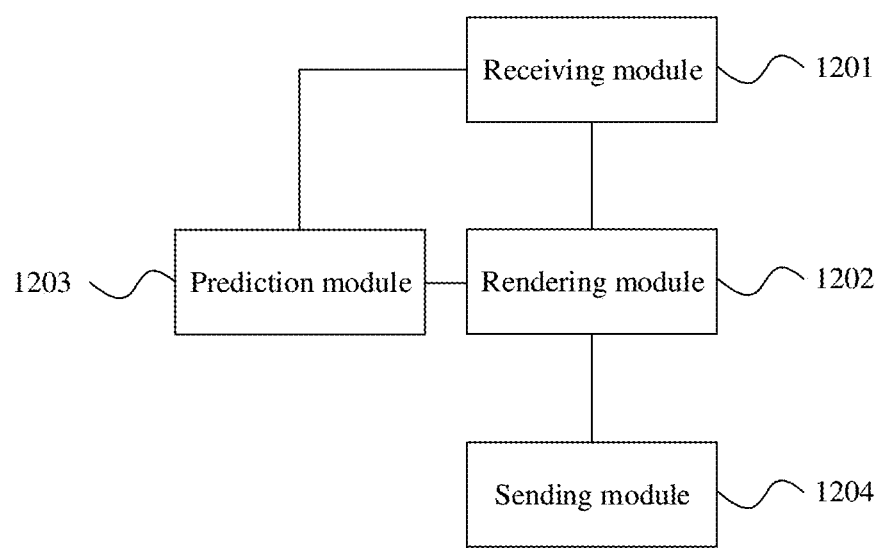
FIG. 12 is a schematic diagram of a structure of an application server embodiment according to this application.

FIG. 12 is a schematic diagram of a structure of an application server embodiment according to this application. As shown in FIG. 12, the server in this embodiment includes a receiving module 1201, a rendering module 1202, a prediction module 1203, and a sending module 1204. The receiving module 1201 is configured to receive a first operation instruction from a user. The rendering module 1202 is configured to render, according to the first operation instruction, a first image of an application corresponding to the first operation instruction. The prediction module 1203 is configured to predict a second operation instruction according to the first operation instruction. The rendering module 1202 is further configured to render, according to the second operation instruction, a second image of the application corresponding to the second operation instruction. The sending module 1204 is configured to: if no operation instruction is received from the user within preset duration after the first operation instruction is received, send a rendered second image to the user.

In a possible implementation, the prediction module 1203 is specifically configured to predict the second operation instruction according to the first operation instruction by using an artificial intelligence method.

In a possible implementation, the rendering module 1202 is specifically configured to: determine the first image, and render the first image.

In a possible implementation, the rendering module 1202 is specifically configured to: determine the second image, and render the second image.

In a possible implementation, the preset duration is 100 ms or 150 ms.

The apparatus in this embodiment may be used to execute the technical solutions of the method embodiment shown in FIG. 5. Implementation principles and technical effects are similar. Details are not further described herein again.

In an implementation process, the steps in the foregoing method embodiments can be implemented by using a hardware integrated logical circuit in the processor, or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The general-purpose processor may be a microprocessor, or the processor may be any conventional processor or the like. The steps of the method disclosed with reference to embodiments of this application may be directly performed by a hardware encoding processor, or may be performed by using a combination of hardware and software modules in an encoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps in the foregoing method in combination with hardware of the processor.

The memory in the foregoing embodiments may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory in the system and the method described in this specification is intended to include, but not limited to, these memories and any memory of another proper type.

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, unit division is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of embodiments.

In addition, function units in embodiments of this application may be integrated into one processing unit, each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method is executed by a server, and the method comprises:
    receiving a first operation instruction from a user;
    rendering, according to the first operation instruction, a first image of an application corresponding to the first operation instruction;
    predicting a second operation instruction according to the first operation instruction;
    rendering, according to the predicted second operation instruction, a second image of the application corresponding to the predicted second operation instruction, to generate a rendered second image;
    in response to no operation instruction being received from the user within a preset duration after the first operation instruction is received, sending the rendered second image to the user;
    in response to receiving the second operation instruction from the user within the preset duration, and the second operation instruction corresponding to the predicted second operation instruction, sending the rendered second image to the user; and
    in response to receiving the second operation instruction from the user within the preset duration, and the second operation instruction not corresponding to the predicted second operation instruction, discarding the rendered second image, and rendering a third image corresponding to the second operation instruction and sending the rendered third image to the user.

2. The method according to claim 1, wherein predicting the second operation instruction according to the first operation instruction comprises:
    predicting the second operation instruction according to the first operation instruction using an artificial intelligence method.

3. The method according to claim 1, wherein rendering the first image of the application corresponding to the first operation instruction comprises:
    determining the first image, and rendering the first image.

4. The method according to claim 1, wherein rendering the second image of the application corresponding to the predicted second operation instruction comprises:
   determining the second image, and rendering the second image.

5. The method according to claim 1, wherein the preset duration is 100 ms.

6. The method according to claim 1, wherein the preset duration is 150 ms.

7. A server, comprising:
   one or more processors; and
   a memory, configured to store one or more programs;
   wherein when the one or more programs are executed by the one or more processors, the server is caused to perform the following:
      receiving a first operation instruction from a user;
      rendering, according to the first operation instruction, a first image of an application corresponding to the first operation instruction;
      predicting a second operation instruction according to the first operation instruction;
      rendering, according to the predicted second operation instruction, a second image of the application corresponding to the predicted second operation instruction, to generate a rendered second image;
      in response to no operation instruction being received from the user within a preset duration after the first operation instruction is received, sending the rendered second image to the user;
      in response to receiving the second operation instruction from the user within the preset duration, and the second operation instruction corresponding to the predicted second operation instruction, sending the rendered second image to the user; and
      in response to receiving the second operation instruction from the user within the preset duration, and the second operation instruction not corresponding to the predicted second operation instruction, discarding the rendered second image, rendering a third image corresponding to the second operation instruction, and sending the rendered third image to the user.

8. The server according to claim 7, wherein when the one or more programs are executed by the processor, the server is caused to perform the following:
   predicting the second operation instruction according to the first operation instruction using an artificial intelligence method.

9. The server according to claim 7, wherein when the one or more programs are executed by the processor, the server is caused to perform the following:
   determining the first image, and rendering the first image.

10. The server according to claim 7, wherein when the one or more programs are executed by the processor, the server is caused to perform the following:
    determining the second image, and rendering the second image.

11. The server according to claim 7, wherein the preset duration is 100 ms.

12. The server according to claim 7, wherein the preset duration is 150 ms.

13. A non-transitory computer-readable storage medium, comprising a computer program, wherein when the computer program is executed by a computer, the computer is caused to perform the following:
    receiving a first operation instruction from a user;
    rendering, according to the first operation instruction, a first image of an application corresponding to the first operation instruction;
    predicting a second operation instruction according to the first operation instruction;
    rendering, according to the predicted second operation instruction, a second image of the application corresponding to the predicted second operation instruction, to generate a rendered second image;
    in response to no operation instruction being received from the user within preset duration after the first operation instruction is received, sending the rendered second image to the user;
    in response to receiving the second operation instruction from the user within the preset duration, and the second operation instruction corresponding to the predicted second operation instruction, sending the rendered second image to the user; and
    in response to receiving the second operation instruction from the user within the preset duration, and the second operation instruction not corresponding to the predicted second operation instruction, discarding the rendered second image, rendering a third image corresponding to the second operation instruction, and sending the third image to the user.

14. The non-transitory computer-readable storage medium according to claim 13, wherein when the computer program is executed by a computer, the computer is caused to perform the following:
    predicting the second operation instruction according to the first operation instruction using an artificial intelligence method.

15. The non-transitory computer-readable storage medium according to claim 13, wherein when the computer program is executed by a computer, the computer is caused to perform the following:
    determining the first image, and rendering the first image.

16. The non-transitory computer-readable storage medium according to claim 13, wherein when the computer program is executed by a computer, the computer is caused to perform the following:
    determining the second image, and rendering the second image.

17. The non-transitory computer-readable storage medium according to claim 13, wherein the preset duration is 100 ms.

18. The non-transitory computer-readable storage medium according to claim 13, wherein the preset duration is 150 ms.

19. The non-transitory computer-readable storage medium according to claim 13, wherein the rendered second image is sent to the user without the computer receiving the second operation instruction.

20. The non-transitory computer-readable storage medium according to claim 13, wherein when the computer program is executed by a computer, the computer is caused to perform the following:
    detecting that a network fluctuates; and
    wherein predicting the second operation instruction comprises:
       predicting the second operation instruction according to detecting that the network fluctuates.

* * * * *